May 28, 1929.  E. H. LORENZ  1,715,204
WARE TRANSFERRING DEVICE
Filed Feb. 1, 1928
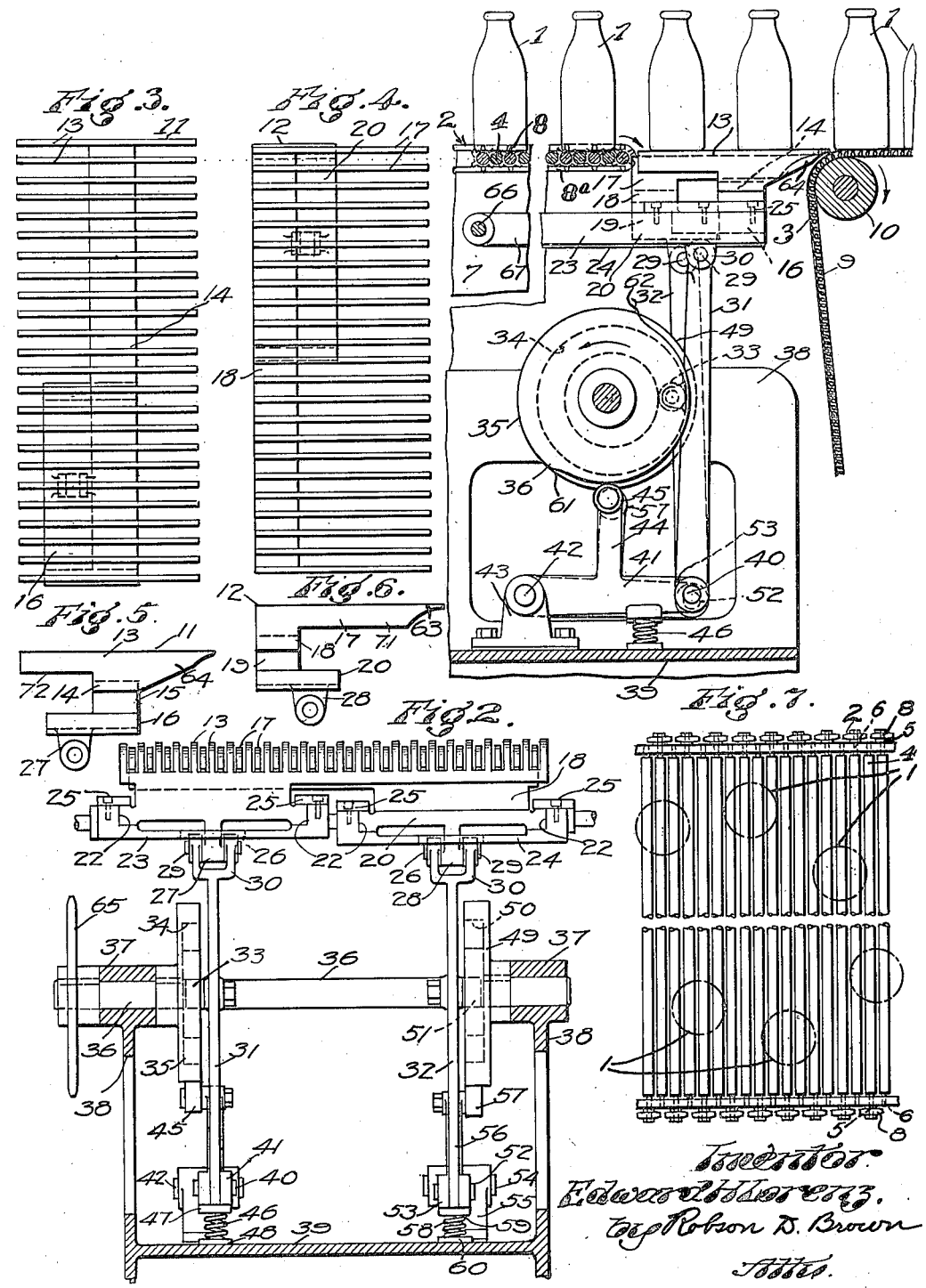

Patented May 28, 1929.

1,715,204

UNITED STATES PATENT OFFICE.

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE.

WARE-TRANSFERRING DEVICE.

Application filed February 1, 1928. Serial No. 251,055.

My invention relates generally to improvements in devices for and methods of transferring bottles or other articles of glassware from a supply conveyor, such as the delivery conveyor from a glassware fabricating machine, onto the adjacent end of a receiving conveyor, such as the conveyor of a lehr, which is spaced from the supply conveyor.

The invention may be used to advantage to effect the tranfer of articles of glassware across a space between a supply conveyor and a receiving conveyor when the ware supporting stretches of the conveyors function to move the articles in the same general direction and are located at substantially the same level.

An important object of the invention is to provide a transfer device on which articles of glassware may be supported and transferred across a gap between the delivery end of a supply conveyor and the receiving end of a lehr conveyor when the physical characteristics and/or relation of the two conveyors are such that the passage of glassware from the supply conveyor directly to the lehr conveyor is not practicable.

A further object of the invention is the provision of a transfer device of the character described which is adapted to transfer transversely spaced articles of glassware automatically from a stacker conveyor onto a lehr conveyor without changing the transverse spacing of the respective articles.

Another object of the invention is the provision of a transfer device of the character described which is adapted to transfer articles of glassware across the space between the adjacent ends of the supply conveyor and the receiving conveyor, respectively, without moving such articles at an angle with the transfer plane, "jigging" such articles up and down, or overturning them.

A still further object of the invention is the provision of a transfer device of the character described which is simple in construction, reliable and efficient in use, not likely to get out of order easily and thoroughly practical commercially.

Other objects and advantages of the invention will be apparent from the following description, when considered in conjunction with the accompanying drawings, which form a part of this application and in which:

Fig. 1 is a view mainly in side elevation but partly in longitudinal vertical section of a transfer device embodying the invention in position to transfer ware from a stacker conveyor onto the upper or ware supporting stretch of a lehr conveyor, only such portions of the conveyors being shown as are thought necessary for an understanding of the use of the invention, Fig. 2 is a front view of the transfer device with the supporting structure therefor shown in transverse vertical section, Figs. 3 and 4, respectively, are plan views of the cooperative sections of the carriage of the ware transferring device, Figs. 5 and 6, respectively, are side elevations of said sections, and Fig. 7 is a plan view of the delivery end portion of the supply or stacker conveyor shown in Fig. 1.

As stated, an important purpose of my invention is to accomplish a symmetrical movement of transversely spaced glass articles across a gap between the conveying means which transports the articles as formed from a glassware shaping machine toward an annealing lehr, and the conveyor of such lehr.

It is of the highest commercial importance that ware to be annealed be properly spaced both transversely and longitudinally of the conveying means of the lehr, not only that the full capacity of the lehr may be taken advantage of, but also that the proper thermal conditions within the lehr may be dependably maintained. In modern lehrs, the amount of heat brought into the lehr at its receiving end by the glassware to be annealed is a large factor in the heating and heat control of the lehr. It is hence obviously important that the manufacturer be able to ascertain just how much heat is being brought into the lehr by the ware. If the ware is placed in the lehr in a haphazard manner, it is manifestly impossible for him to know this.

Modern lehrs were, prior to my invention, and still are, to a large extent, loaded automatically by a device commercially known as a stacker which, in its usual and best known form, comprises a moving arm having ware-gripping tongs thereon which grip each article of the ware brought to a definite station by a buck or a conveyor and place it in a proper place or position upon the lehr conveyor. These stackers have heretofore been built so as to accomplish the uniform and proper spacing of glassware on the lehr conveyor.

Another form of stacking device has heretofore been suggested; namely, one in which each piece of ware as fabricated, is placed upon a conveyor comprising rollers, such as those shown in Fig. 7 of the accompanying drawings. The articles carried by such conveyor may be spaced transversely thereof by any suitable known distributing mechanism, either at the time they are placed on the conveyor or during their transit thereon.

Such a device, while capable of accurate and proper assembly of the articles in rows so spaced as to be suitable for annealing, could not be used prior to the present invention in an assembly in which the conveyor of the lehr forms a separate device from the assembling conveyor. It is an important purpose of the present invention to adapt such an assembling conveyor for use with a separate lehr conveyor by providing means for transferring the transversely spaced assembled articles from the end of the assembling conveyor to the lehr conveyor without disturbance of the transverse spacing.

A practical construction for carrying the invention into effect embodies means for automatically supporting transversely spaced bottles or other articles of glassware as delivered thereto by an associated supply conveyor and for moving such articles across the space between the delivery end of the supply conveyor and the receiving end of an associated receiving conveyor and then depositing the articles on the receiving conveyor without changing the transverse distance between the respective articles. The transfer device employs a plurality of independently movable sections for supporting and transferring transversely spaced articles of glassware between the supply conveyor and the receiving conveyor and means for operating such sections in timed relation to each other so that the articles will be supported in the same plane throughout their travel between the conveyors and will be moved continuously from the supply conveyor to the receiving conveyor. The speed of the means for driving the ware supporting and transferring sections of the device is selected to prevent shocks and jars to and possible overturning of the articles as they pass from the delivery conveyor to the transfer device and from the transfer device to the lehr conveyor, and may be varied to suit the conditions existing at any given time.

Referring now to the drawings, I show in Fig. 1 a practical embodiment of the invention in position to transfer transversely spaced bottles 1 from a stacker conveyor 2 onto a lehr conveyor 3. A fragmentary portion of the stacker conveyor is shown to advantage in Fig. 7 as comprising a series of spaced parallel rollers 4 having extending axial pivot elements 5 and 6 at their opposite ends journaled in bearings in supporting side members 7 of the supporting frame structure of the supply conveyor. The extending pivot elements 5 of adjacent rollers 4 may be located at opposite ends of such rollers and extend through the associated supporting frame members 7. The extending ends of these pivot members 5 carry sprockets 8 with which chains 8ª are engaged. The chains 8ª may be driven in any suitable known manner so that the rollers 4 will be turned in the direction indicated by the arrow in Fig. 1. The rollers 4 are located at the same level. The operation of this roller conveyor in conjunction with the operation of associated ushering or transverse distributing devices, not shown, will cause the articles which have been deposited thereon to be spaced transversely of the conveyor and to be advanced along said conveyor to the delivery end thereof.

The conveyor 3 may be part of a lehr such as is disclosed in Patent No. 1,560,481, issued to V. Mulholland November 3, 1925. This lehr conveyor may comprise a flexible ware supporting member 9 which extends over a roller 10 so that the upper or ware supporting stretch of the conveyor member 9 will have its upper surface located substantially in a plane which is tangent to the highest portions of the rollers 4 of the supply conveyor. In other words, the ware supporting surfaces of the supply conveyor 2 and the receiving conveyor 3, respectively, are located at substantially the same level. The flexible conveyor member 9 preferably is of the chain link construction shown in Fig. 1 but may have any other suitable known construction. The roller 10 may be turned in the direction indicated by the arrow in Fig. 1 to cause movement of the upper stretch of the conveyor 3 in the direction away from the supply conveyor or the conveyor member 9 may be moved in that direction in any other suitable known manner.

The rollers 4 of the supply conveyor and the roller 10 of the lehr conveyor are too large to permit relative positioning of the two conveyors so that bottles and like articles of glassware may be moved directly from the last roller 4 at the delivery end of the supply conveyor onto the ware supporting stretch of the lehr conveyor belt 9 above the roller 10 without overturning of the ware and without likelihood that at least some of the ware would fall downwardly into or through the gap which must necessarily exist between the ware supporting surface of the last roller 4 and the adjacent end of the horizontal ware supporting surface of the conveyor belt 9. The invention therefore provides a novel and efficient means for transferring the articles across such gap. While the embodiment of the invention illustrated in the accompanying drawings has the ware supporting surfaces of the supply conveyor and the lehr conveyor longitudinally aligned with each other and at substantially the same level, it is to be understood that these conditions are not essential to the successful operation of the invention as the ware may be delivered from a supply conveyor to the transfer device at various angles to the direction of movement of the supporting surface of the lehr conveyor and the transfer device will be effective to transfer such ware onto the lehr conveyor, irrespective of the configuration of the gap that exists between the adjacent ends of the supply conveyor and the lehr conveyor.

The ware transferring device for transferring the articles of glassware from the supply conveyor 2 to the receiving conveyor 3 comprises a transfer carriage which preferably is formed of two cooperative sections indicated generally at 11 and 12, respectively. The section 11 is shown best in Figs. 3 and 5 and includes a ware supporting head portion which comprises a plurality of spaced parallel supporting members 13 of bar-like form. The upper surfaces of the members 13 preferably are substantially straight and flat. The members 13 are connected at their lower edges and maintained firmly in spaced parallel relation by a transverse web 14 which is carried on an up-standing reduced portion 15 of a base 16.

The section 12 likewise includes a head portion comprising a plurality of spaced parallel ware supporting members 17 which are of bar-like form. The upper surfaces of the members 17 likewise preferably are straight and flat. The members 17 are connected at their lower edges and are maintained in spaced parallel relation by a transverse web 18 that is carried by an up-standing reduced portion 19 of the base portion 20 of the carriage section 12.

The spacing between adjacent ware supporting members of the head portions of the two carriage sections preferably is the same. The carriage section 11 may comprise one more member 13 than there are members 17 in the head portion of the carriage section 12. The connections of the web portions and the bar-like supporting portions of the two sections are at different places along the lengths of such bar-like supporting members and the connections of the base portions and the web portions of the two sections likewise are at different places along the lengths of the web portions so that the sections 11 and 12 may be arranged with each supporting member 17 of the section 12 disposed between two members 13 of the section 11. The web portions 14 and 18 of the two sections then will be disposed in side by side relation and the base portions of the two sections will be located substantially in end to end relation or spaced transversely of the transfer carriage as shown in Figs. 1 and 2 when corresponding ends of the members 13 and 17 are flush with each other.

The base portions 16 and 20 of the transfer carriage preferably are substantially rectangular and constitute slide blocks having their side edge portions received slidably in guideways 22 in the inner faces of parallel sides of similar slide holders 23 and 24, respectively. Each of the slide holders 23 and 24 comprises a substantially flat bottom having the aforesaid parallel sides upstanding therefrom at its side edges. The sides of the slide holders may have extensions at one end thereof, as indicated at 67 in Fig. 1, supported at their extremities on a horizontal pivot shaft 66. The shaft 66 may be supported by the side members 7 of the supporting frame of the conveyor 2 below the level of the rollers 4. The slide holders and their supporting extensions 67 are sufficiently long to permit nearly vertical movements of the supporting surfaces of the head members of the carriage sections upward to and downward from the plane of the ware supporting surfaces of the conveyors 2 and 3 as the slide holders are swung through a slight angle about the axis of the horizontal pivot shaft 66. The vertical distance from the axis of the shaft 66 to the plane of the supporting surfaces of the conveyors 2 and 3 preferably is such that the supporting upper surfaces of the head members of each carriage section will be disposed substantially level with the ware supporting surfaces of the conveyors 2 and 3 when the slide holder for that carriage section is substantially horizontal. The portions of the side members of the holders 23 and 24 which serve as the top walls of the guideways 22 may be formed separate from the remaining portions of the holders and secured thereto by fastening devices 25 as shown in Fig. 2 for convenience in removing the carriage sections from and replacing them in the holders.

The bottoms of the holders 23 and 24 are formed with apertures 26 therein. A depending ear 27 on the base 16 of the carriage section 11 extends loosely downward through the aperture 26 in the slide holder 23. An ear 28 likewise depends from the base 20 of the carriage section 12 through the aperture 26 in the bottom of the slide holder 24. The ears 27 and 28 are pivotally connected by horizontal pivot elements 29 with forks 30 on the upper ends of similar levers 31 and 32, respectively. The lever 31 carries a laterally disposed cam roll 33 which has a rolling contact with the outer and inner walls of an endless cam groove 34 in the adjacent face of a cam disk 35. The cam disk 35 is secured on a shaft 36 which is journaled in aligned bearings 37 in parallel supporting members 38. The supporting members 38 are carried on a base 39.

The connection of the cam roll 33 with the lever 31 is intermediate the length of the lever and the latter is connected at its lower end by horizontal pivot element 40 with one end of a substantially horizontal lever 41. The lever 41 is supported at its other end on a horizontal pivot element 42 which is carried by a bracket 43 on the base 39. The lever 41 is provided intermediate its length with an up-standing arm 44 which carries a cam roll 45 in position to have a rolling contact with the peripheral edge of the cam disk 35. A compression spring 46 is disposed between a plate 47 on the lower edge of the lever 41 and a plate 48 on the base 39 and tends to swing the lever 41 upwardly about the axis of the pivot member 42 so that the cam roll 45 will be kept continuously in contact with the peripheral edge of the cam disk 35.

The shaft 36 also carries a cam disk 49 which is similar to the cam disk 35 and is provided with a groove 50 in its inner face. A cam roll 51 on the lever 32 intermediate the length of such lever is received in the cam groove 50 and is in rolling contact with the inner and outer walls thereof. The lower end of the lever 32 is pivotally connected by a horizontal pivot element 52 with one end of a substantially horizontal lever 53. The lever 53 is fulcrumed at its other end on a horizontal pivot element 54 which is carried by an up-standing bracket 55 on the base 39. An up-standing arm 56 on the middle portion of the lever 53 carries a cam roll 57 which is held continuously in rolling contact with the peripheral edge of the cam disk 49 by a compression spring 58. The compression spring 58 is located between a plate 59 on the lower edge portion of the lever 53 and a plate 60 on the base 39. The peripheral edge of each of the cam disks 35 or 49 has circumferentially spaced cam portions, such as shown at 61 and 62, respectively, on the cam disk 35 in Fig. 1. When either cam disk is rotated in the direction indicated by the arrow in Fig. 1, the cam surface 61 engages with the cam roll 45 or 57 on the associated lever 41 or 53 and swings such lever downward against the action of the associated spring 46 or 58. The lever 41 or 53 may be held in its downwardly swung position until the cam roll 45 or 57 thereon contacts with the cam portion 62 of the associated cam disk. The lever then is permitted to swing upward under the influence of its spring 46 or 58 and may remain in its upwardly swung position until the cam roll 45 or 57 again contacts with the portion 61 of the associated cam disk. These periodic swinging movements of the lever 41 and 53 in vertical planes will cause periodic up and down movements of the associated levers 31 and 32 and consequently periodic up and down movements of the transfer carriage sections 11 and 12. The apertures 26 in the bottoms of the slide holders 23 and 24 are sufficiently large to permit the connected portions of the levers 31 and 32 and the ears 27 and 28 of the carriage sections to move vertically through the apertures 26 and also to permit the carriage sections to move longitudinally of the holders 23 and 24 as the levers 31 and 32 are oscillated about the axes of the pivot elements 40 and 52. The oscillatory movements of the levers 31 and 32 about the axes of the pivot elements 40 and 52 are caused by the contact of the cam rolls 33 and 51 with the inner and outer walls of the cam grooves 34 and 50 as the cam disks 35 and 49 rotate about the axis of the shaft 36.

The portions of the supporting members 17 of the carriage section 12 which extend above the web portion 14 of the section 11 are undercut, as indicated at 71, while the portions of the supporting members 13 of the section 11 which extend above the web portion 18 of the section 12 also are undercut as indicated at 72. Ample clearance thus is provided between the web portion of each of the carriage sections and the overlying portions of the supporting members of the other carriage section to permit the relative vertical movements of the carriage sections which will take place when the levers 41 and 53 are oscillated in timed relation about the axes of their pivot elements 42 and 54, respectively. The ends of the supporting members 17 and 13 of the carriage sections next to the conveyor 3 are cut away downwardly and rearwardly, as indicated at 63 and 64 respectively, so that the extreme front end portions of the supporting members of each of the carriage sections may project above the roller 10 nearly into contact with the adjacent end of the horizontal or ware supporting stretch of the conveyor member 9 when such carriage section is at the limit of its movement toward the conveyor 3. The edges of these cut-a-way portions 63 and 64 may be curved to conform substantially to the curvature of the portion of the conveyor 9 on the roller 10, or may be beveled or have any other desirable shape.

The operation of the ware transferring device which has just been described is substantially as follows: The cam disks 35 and 49 preferably are set on the shaft 36 so that the cycles of movement of the sections of the transfer carriage will over-lap, assuming that a cycle of each carriage section begins with that section at the end of its movement toward the supply conveyor and below its highest position. Such cycle of each carriage section then may be described as comprising an upward movement of the section until the upper surfaces of the supporting head members thereof are substantially level with the ware supporting surfaces of the conveyors 2 and 3. The rear ends of the supporting head members of that section then are close to the delivery end of the supply conveyor 2. Bottles 1, or other articles of glassware, moving from the end roller at the delivery end of the supply conveyor will be received on and supported by the head members of that carriage section of the transfer device. The rotation of the cam disk for actuating that carriage section will cause forward movement thereof until the beveled front ends of the supporting head members of the carriage section are close to the ware transferring stretch of the conveyor 3. The carriage section then will be moved rearwardly and downwardly by the simultaneous actions of a portion of the cam groove 34 or 50 and the cam surface 61 of a cam disk on the associated vertical and horizontal levers of the carriage section operating mechanism. The carriage section then will be moved rearwardly below its upper or ware supporting position to complete the cycle. In the meantime, a cycle of the second carriage section has commenced so that the second carriage section will have been moved upward to its highest or ware supporting position close to the supply conveyor 2, and has started forward before the first carriage section completes its forward or ware transferring stroke toward the conveyor 3. The ware transferred thus will be supported in the same plane by a continuously moving surface during its entire movement from the supply conveyor to the receiving conveyor.

The shaft 36 may be driven in any suitable known manner, as by imparting motion thereto through the sprocket 65 from a driven chain (not shown). The speed of rotation of the shaft 36 may be selected to cause the forward or ware supporting movements of the sections of the transfer carriage to be more rapid than the rate of movement of the conveyor 3, and less rapid than the forward ware transferring movements of the supply conveyor 2. The distance between adjacent rows of bottles or other articles of glassware delivered to the conveyor 3 then will be less than the distance between longitudinally spaced adjacent articles on the conveyor 2. The cams 33 and 49 may be replaced by cams having cam grooves in their faces and cam surfaces on their peripheries different from those which have been described, for the purpose of varying the movements of the sections of the transfer carriage according to different service conditions at different times, as for example, variations of distances between different sets of supply conveyors and receiving conveyors with which the device may be used at different times.

It also is obvious that the shaft 66 on which the slide holders 23 and 24 are pivoted may be carried by supporting members 38 of the frame structure of the transfer device instead of by the supporting member 7 of the frame structure of the conveyor 2. The transfer device and its supporting structure then will be unitary and may be moved readily from place to place for use with different sets of spaced conveyors. The base 39 of the supporting structure of the transfer device may be supported on wheels (not shown) to facilitate movement of the device from place to place, if desired.

The apertures in the slide holders and the spaces between adjacent members of the ware supporting head portions of the carriage sections permit ample circulation of air through the transfer carriage around the articles thereon to aid in cooling such articles and to prevent over-heating of the supporting members of the carriage sections.

It will be obvious that articles of glassware of any usual or commercially usable size may be transferred from a supply conveyor to a receiving or lehr conveyor by a mechanism embodying the invention as hereinbefore described.

I claim:

1. A device for transferring articles of glassware from the delivery end of a stacker conveyor to the receiving end of a lehr conveyor that is spaced from said stacker conveyor, said transfer device including a transfer carriage comprising a plurality of independently movable sections, and means for operating said sections in timed relation to one another so that each cycle of movement of each section comprises an upward movement thereof from a position below a transfer plane to position to receive ware in the transfer plane from the stacker conveyor, a forward movement thereof to position to deliver ware to the lehr conveyor, a movement downwardly from the transfer plane, and a rearward movement below the transfer plane to its first named position, said forward or articles transferring movements of each section beginning prior to the completion of the preceding forward movement of another of said sections.

2. A ware transferring device comprising a carriage having a pair of sections, each section having a head portion comprising a plurality of spaced ware supporting members, said sections being arranged so that the ware supporting head members of one section alternate with the ware supporting head members of the other section, and means for imparting cycles of movement to said sections, each cycle of movement of each section including a ware transferring movement thereof from a position to receive articles of glassware from a stacker conveyor to a position to deliver articles of glassware to a lehr conveyor and a return non-transferring movement, the ware transferring movement of each cycle of each section commencing before the termination of the preceding ware transferring movement of the other section.

3. In a ware transferring device, a transfer carriage comprising a pair of independently movable sections, each comprising a plurality of spaced parallel ware supporting head members, a transverse web connecting said head members, and a base carrying said web, said sections being arranged so that each ware supporting head member of one section is located between adjacent ware supporting head members of the other section, and means for movably supporting and operating said sections so that each section is periodically moved substantially in a straight line from a supply conveyor to a receiving conveyor with the upper surfaces of the ware supporting head members thereof substantially in the plane of the ware supporting surfaces of said conveyors and then is returned below said plane, said substantially straight forward movements of each section beginning prior to the termination of like movements of the other section.

4. The combination, with a stacker conveyor and a lehr conveyor spaced from the stacker conveyor and having its ware supporting surface located substantially in the same plane as the ware supporting surface of the stacker conveyor, of a transfer device comprising a carriage having a plurality of independently movable sections, each section comprising a plurality of spaced substantially parallel ware supporting head members, a web connecting said head members and a base carrying said web, the ware supporting head members of one section alternating with the ware supporting head members of the other section, a pair of holders supporting the base portions of said sections to permit ware supporting movements of the sections from the stacker conveyor toward the lehr conveyor and return non-supporting movements of said sections, and means connected with said sections for imparting cycles of movement thereto.

5. In combination, a stacker conveyor comprising a plurality of parallel adjacent rollers adapted to support transverse rows of articles of glassware thereon, means for rotating said rollers in unison in the same direction so as to advance said rows of articles progressively to the delivery end of the stacker conveyor, a lehr conveyor spaced from said stacker conveyor and having a ware supporting surface substantially level with the ware supporting surface of the stacker conveyor, and a transfer device comprising a pair of separate sections, each comprising a plurality of ware supporting head members alternating with the head members of the other section and each movable vertically from a plane below that of the ware supporting surfaces of said conveyors to a position in said plane to receive a row of articles of glassware from the stacker conveyor, then horizontally forward to position to deliver ware to the lehr conveyor, and finally downward and rearwardly below the plane of the ware supporting surfaces of said conveyors, and means for operating said sections so that each forward movement of each section commences prior to the termination of a like movement of the other section.

6. In a ware transferring device, a carriage comprising a pair of sections, each having a plurality of spaced parallel head members, a web connecting said head members, and a base carrying said web, the head members of the respective sections alternating with each other, a pair of holders pivoted at one end to swing about a horizontal axis, said holders and the base portions of said carriage sections having co-engaging means for slidably supporting and retaining the bases of said carriage sections on the holders, substantially vertical levers pivotally connected at their upper ends with said carriage sections, substantially horizontal levers fulcrumed at one end for swinging movement about horizontal axes parallel to the axis of the pivotal support for said holders and pivotally connected at their other ends with the lower ends of the substantially vertical levers, and cam means for actuating said levers to cause cycles of movement of said carriage sections.

7. In a ware transferring device, means comprising a pair of moving members having cycles of movement with overlapping ware supporting phases for successively receiving transversely spaced articles of glassware from the delivery end of a supply conveyor, supporting and continuously moving said articles to the receiving end of a second conveyor and delivering said articles successively to the said receiving conveyor without changing the transverse spacing of the articles, and means for operating said transfer means.

8. In combination, a stacker conveyor comprising a plurality of parallel substantially horizontal supporting rollers adapted to rotate in unison about their axes to progressively move transversely spaced articles of glassware thereon, a lehr conveyor to which said articles are to be transferred, said lehr conveyor having a substantially horizontal ware supporting stretch spaced from the first conveyor and having its ware supporting surface substantially level with that of the first conveyor, and a transfer device comprising a plurality of separate sections, each movable independently from a ware receiving position at the delivery end of the stacker conveyor to a ware delivering position at the receiving end of the lehr conveyor and having a return non-supporting movement, and means for operating said sections of the transfer device so that the ware transferring movement of each section commences before the termination of a ware transferring movement of another section.

9. In combination, a substantially horizontal stacker conveyor for glassware, a lehr conveyor comprising a substantially horizontal roller spaced from the delivery end of the stacker conveyor and a flexible conveyor member extending across said roller and including a substantially horizontal stretch supported at one end by said roller, said horizontal stretch being adapted to support and move articles of glassware at substantially the same level and in substantially the same direction as the stacker conveyor, and a device for transferring said articles from the delivery end of the stacker conveyor to the adjacent end of said lehr conveyor, said transfer device including a carriage comprising a plurality of sections, each having a ware transferring movement substantially in a horizontal plane from a position to receive articles from the stacker conveyor to a position to project the delivery end of the section partially across the roller of the lehr conveyor close to the adjacent end of the horizontal ware supporting stretch of said lehr conveyor, each of said sections having a return non-supporting movement below said horizontal plane during a ware supporting movement of another section.

10. In combination, a substantially horizontal conveyor adapted to support articles of glassware, a lehr conveyor comprising a flexible supporting member having a substantially horizontal ware supporting stretch spaced from the first conveyor, said flexible conveyor member extending across a supporting roller at the receiving end of said horizontal stretch, and a transfer device including a carriage comprising a pair of sections, each having a plurality of spaced substantially horizontal bar-like supporting head members, the head members of the two sections alternating transversely of the carriage, said head members having their ends nearest to the lehr conveyor beveled at their under sides, and means for supporting and operating said carriage sections so that each is moved periodically forward from a position to receive articles from the stacker conveyor to position to project the beveled ends of its head members partially across the supporting roller of the lehr conveyor close to the adjacent end of the horizontal stretch of the lehr conveyor and then is given a return movement at a lower level, the forward movement of each section commencing before the preceding return movement of the other section.

11. Automatic machinery for handling articles of glassware delivered by a glassware forming machine, comprising a stacker conveyor adapted to receive articles of glassware from the forming machine and to advance such articles on said conveyor, a lehr conveyor spaced from and substantially in line with the stacker conveyor, and a transfer device comprising a pair of moving members having cycles of movement with overlapping ware supporting phases for automatically and continuously transferring said articles successively from the stacker conveyor to the lehr conveyor.

12. Automatic machinery for handling articles of glassware delivered by a glassware forming machine, comprising a continuously moving conveyor for receiving articles of glassware from the forming machine, a lehr conveyor having its ware supporting surface spaced from the delivery end of said first named conveyor, and a transfer device comprising a pair of ware transferring members having cycles of movement overlapping to provide a continuously moving surface for supporting glassware delivered by said first named conveyor and for transferring said glassware onto the ware supporting surface of the lehr conveyor.

13. A device for transferring articles of glassware from one conveyor to a second conveyor spaced from the first conveyor, comprising means providing a glassware supporting surface extending substantially across the space between said conveyors and comprising a pair of moving members for advancing glassware supported on said surface from said first conveyor toward position to be delivered onto said second conveyor, said members having cycles of movement with ware supporting phases, the early portion of the ware supporting phase of each overlapping the latter portion of the ware supporting phase of the other.

14. A device for transferring articles of glassware from one conveyor to a second conveyor spaced from the first conveyor, comprising means for supporting and moving the ware from the first conveyor to the second conveyor, said means moving only part of the distance that said ware is moved during its transfer from the first conveyor to the second conveyor so that at no time does a substantial gap exist between the transfer means and either of said conveyors.

15. Apparatus for transferring articles of glassware from a forming machine, comprising a conveyor adapted to receive the articles from the forming machine and to advance them in transversely spaced relationship upon said conveyor, a second conveyor spaced from and substantially in line with the said first-named conveyor, and means for supporting and moving the ware from the first conveyor to the second conveyor without altering the transverse spacing of the respective articles, said means moving only part of the distance that said ware is moved during the transfer from the first conveyor to the second conveyor, so that at no time does a substantial gap exist between the transfer means and either of said conveyors.

16. In glassware handling apparatus, a conveyor comprising a plurality of parallel adjacent rollers adapted to support transverse rows of articles of glassware thereon in transverse spaced relationship, means for rotating said rollers in unison in the same direction so as to advance said rows of articles progressively to the delivery end of the conveyor, a second conveyor spaced from but substantially in line with said first-named conveyor, the second conveyor comprising an endless belt and a roller around which the belt is adapted to travel, the radius of the last roller being relatively large as compared to the radii of the first-named rollers, and means for supporting and moving the ware from the first conveyor to the second conveyor, said means moving only part of the distance that said ware is moved during the transfer from the first conveyor to the second conveyor, so that at no time does a substantial gap exist between the transfer means and either of said conveyors.

Signed at Hartford, Conn., this 31st day of January, 1928.

EDWARD H. LORENZ.